(12) United States Patent
Babl et al.

(10) Patent No.: US 8,978,712 B2
(45) Date of Patent: Mar. 17, 2015

(54) FLEXIBLE TUBES

(75) Inventors: Thomas Babl, Taikoo Place (HK); Marc Marbach, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 830 days.

(21) Appl. No.: 12/823,612

(22) Filed: Jun. 25, 2010

(65) Prior Publication Data

US 2011/0017304 A1    Jan. 27, 2011

(30) Foreign Application Priority Data

Jul. 2, 2009  (EP) .................................... 09008699

(51) Int. Cl.
| | | |
|---|---|---|
| F16L 11/00 | (2006.01) | |
| F16L 9/00 | (2006.01) | |
| F16L 11/15 | (2006.01) | |
| B60H 1/00 | (2006.01) | |
| F16L 11/11 | (2006.01) | |

(52) U.S. Cl.
  CPC ............ F16L 11/15 (2013.01); B60H 1/00564 (2013.01); F16L 11/111 (2013.01)
  USPC .......................................... 138/121; 138/173

(58) Field of Classification Search
  CPC .................................. F16L 11/11; F16L 11/15
  USPC ....................................................... 138/121
  See application file for complete search history.

(56) References Cited

U.S. PATENT DOCUMENTS

| | | | |
|---|---|---|---|
| 4,235,427 A | | 11/1980 | Bialobrzeski |
| 5,603,358 A | * | 2/1997 | Lepoutre ..................... 138/149 |
| 6,021,816 A | | 2/2000 | Jaltsch et al. |
| 6,056,018 A | * | 5/2000 | Renaud ........................ 138/121 |
| 8,357,326 B2 | | 1/2013 | Dieter |
| 2002/0017331 A1 | * | 2/2002 | Renaud ........................ 138/121 |
| 2002/0088500 A1 | | 7/2002 | Turner et al. |

(Continued)

FOREIGN PATENT DOCUMENTS

| | | |
|---|---|---|
| EP | 0368096 A2 | 5/1990 |
| EP | 1176351 A2 | 1/2002 |
| EP | 1233223 A2 | 8/2002 |

(Continued)

OTHER PUBLICATIONS

European Search Report from co-pending Application EP09008699 dated Nov. 18, 2009, 7 pages.

(Continued)

*Primary Examiner* — Paul R Durand
*Assistant Examiner* — Vishal Pancholi
(74) *Attorney, Agent, or Firm* — Jennifer R. Seng

(57) ABSTRACT

The present invention relates to a flexible tube with folding bellows and a plurality of convolutes formed in the wall of the tube and the folding bellows has a convolute which has two opposite bending zones and two restricted elongation zones, where the arrangement has the restricted elongation zones between the opposite bending zones, and the height of the external surface of the convolutes in the restricted elongation zones is below the height of the external surface of the convolutes in the bending zones but still above external surface of the tube, and the wall thickness of the flexible tube in at least one restricted elongation zone in at least one convolute, preferably in all convolutes, of the restricted elongation zones of the tube is specifically greater than the wall thickness in the bending zones.

14 Claims, 2 Drawing Sheets

(56) References Cited

U.S. PATENT DOCUMENTS

2006/0254663 A1* 11/2006 Renaud ........................ 138/121
2007/0245791 A1 10/2007 Kiefer

FOREIGN PATENT DOCUMENTS

| | | |
|---|---|---|
| GB | 1471692 | 4/1977 |
| WO | 9922171 | 6/1999 |
| WO | 0202981 A1 | 1/2002 |

OTHER PUBLICATIONS

State Intellectual Property Office of P.R.C. First Office Action, Application No. 201010223153.4, Dec. 3, 2013, 13pp.

State Intellectual Property Office of P.R.C. Search Report, Application No. 201010223153.4, Dec. 3, 2013, 2 pp.

* cited by examiner

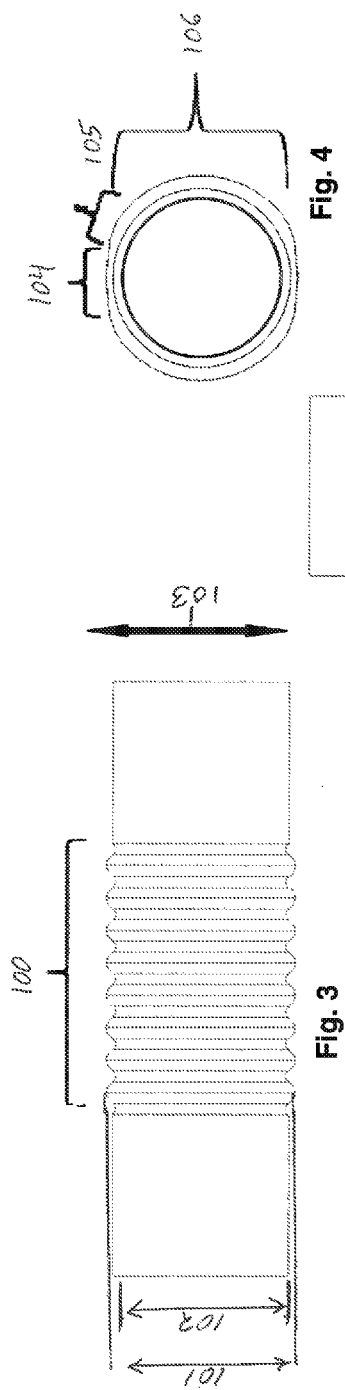
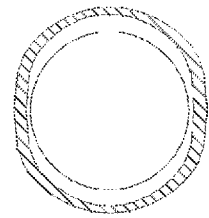

FLEXIBLE TUBES

The present invention relates to a flexible tube with at least one folding bellows which has a plurality of convolutes which have been formed in the wall of the tube and which run across an external surface of the tube, where there is no separation between the convolutes in an axial longitudinal direction of the tube and the folding bellows has at least one convolute which has two opposite bending zones and two restricted elongation zones, where the arrangement has the restricted elongation zones between the opposite bending zones, and the height of the external surface of the convolutes in the restricted elongation zones is below the height of the external surface of the convolutes in the bending zones but still above external surface of the tube, and the wall thickness of the flexible tube in at least one restricted elongation zone in at least one convolute, preferably in all convolutes, of the restricted elongation zones of the tube is specifically greater than the wall thickness in the bending zones. For the purposes of the present invention, the meaning of the expression "rendered specifically greater than the wall thickness in the bending zones" is an increase in the wall thickness in the restricted elongation zones to a maximum of five times the value of the average wall thickness in the bending zones, but no less than 1.2 times the value of the average wall thickness in the bending zones. The specific increase in wall thickness in the restricted elongation zone is preset before the process of extrusion of the parison is complete, by virtue of a parison wall thickness that is radially partially higher in region of the subsequent restricted elongation zones.

This specific increase in wall thickness prior to completion of the extrusion process leads to differences in wall thicknesses in comparison with the greater prior-art wall thicknesses that are an inevitable result of technological and process factors, by virtue of the different degrees of stretching in the restricted elongation zones and the bending zones.

It should be noted for clarification that the scope of the invention encompasses any desired combination of all of the definitions and parameters mentioned in general terms or in preferred ranges.

BACKGROUND OF THE INVENTION

DE 197 07 518 C1 relates to a corrugated tube composed of thermoplastic polymer material for use as fluid line, with at least one polymer layer, having coherent, geometric external profiles separated from one another in the direction of the axis of the tube and defining, in succession in at least one angular region in an axial longitudinal direction, a corrugation on the curved surface of the tube, where the coherent, geometric external profiles have been formed in such a way that two approximately opposite generatrix lines on the curved surface of the tube are free from corrugations and these generatrix lines extend in the longitudinal direction of the tube.

WO 1999/0022171 A1 describes a folding bellows composed of a hose with a cross section that is in essence circular, where the hose has an external surface and an internal surface, and a large plurality of raised peripheral convolutes which are formed in the surface of the hose, where the inner surface of the hose defines the inner surface of the convolutes, and where the external surface of the hose defines the external surface of the convolutes, characterized in that at least one of the convolutes has been formed in such a way that a section of the convolute is in essence level with the surface of the hose, while the cross section, which is in essence circular, of the hose is retained.

WO 2002/002981 A1 describes a flexible pipe with a bellows which has a plurality of convolutes which have been formed in the wall of the tube and which run across an external surface of the tube, where the convolutes are separate in the axial direction of the tube, and where at least one of the convolutes has two opposite bending sections and, located between the bending sections, two restricted elongation sections, and where the height of the bending sections above the external surface of the tube is greater than the height of the restricted elongation sections above the external surface of the tube. The wall thickness of the tube described in WO 2002/002981 A1 is specifically uniform in the peripheral direction (WO 02/02981 A1, (D1), page 12, lines 12-14).

EP 1 233 223 A2 describes a tube with defined axial stiffness, manufactured from a material with at least one flexible bellows region formed in a manner similar to that of corrugations, where at least two regions of the bellows have been formed flat in an axial direction in order to reduce axial length change due to high internal pressure.

EP 1 176 351 A2 defines a tubular hose with a plurality of convolutes, which individually have alternating peaks and valleys. Each convolute has a height which is described by the difference of the radii between the corresponding peaks and valleys. The height within a convolute varies across the periphery of the tube, with a maximum height and a minimum height. The minimum height of the smallest or smallest-height region of a convolute corresponds to at least 10% of the maximum height of this convolute. In one embodiment mentioned in EP 1 176 351 A2, the maximum height of a convolute is at least twice the minimum height of this convolute.

A disadvantage of the prior-art embodiments is that the wall thickness ratio between the restricted elongation zones and bending zones cannot be varied. The wall thickness in the bending zones, and the prescribed geometry of the tube in the region of the convolutes, inevitably determines the wall thickness in the restricted elongation zones and thus the elasticity of the restricted elongation zones for particular relative movements of the two ends of the tube. For a given geometry, a change of elasticity in the restricted elongation zones can be brought about only via changes in the material or a change in the wall thickness of the entire tube. If the material and the fundamental wall thickness of the tube have been prescribed, the only remaining way of adjusting the flexibility of the component is to change its geometry, and this in turn requires a modification/change to the tooling used to produce the flexible tube or corrugated tube.

Concentrations of stress can also occur when internal pressure is applied in prior-art embodiments by virtue of the change in stiffness, in the transition zones between the convolutes and the straight region between two convolutes (see, for example, WO 2002/002981A1, page 6, lines 8-16) or there can be an adverse effect on the mechanical properties of the components, caused by notches (WO 2002/002981 A1, page 13, FIGS. 6A and 6B).

Because of the characteristic nature of the typical processing methods used for tubes, the internal surface of the flat convolutes (restricted elongation zones) can be almost straight, as shown in some of the figures in WO 2002/002981 A1, e.g. FIG. 6. FIG. 8D of the same prior art indeed shows a straight internal surface. The effect of these flat surfaces is that the stress placed on the material in these restricted elongation zones, for particular relative movements of the two ends of the tube in an axial longitudinal direction, is independent of the wall thickness.

Finally, if wall thickness in the restricted elongation zones is more uniform than in the remainder of the convolutes, the result is high stresses in these restricted elongation zones when internal pressure is applied, since most of the load is absorbed by these stiffer sections (see WO 2002/002981 A1, page 10, lines 6 to 25: "... which design has the beneficial effects of providing a more uniform wall thickness in the restrained elongation section of the bellows"). When internal pressure is applied, the stress within the material depends on the projected pressurized cross section and on the wall thickness of the tube. It can therefore be advantageous to have greater wall thickness rather than uniform wall thickness, in particular in the restricted elongation zones.

It is therefore an object of the present invention to provide a flexible tube which withstands high internal pressure, preferably 3.2 bar absolute and more, and which moreover withstands this without, or with only very little, loss of flexural flexibility.

The difficulty here is the required combination of stiffness in an axial longitudinal direction when high internal pressure is applied, as mentioned above (this being a problem that could be solved by using a straight tube) with the flexural flexibility demanded (this being a problem which could be solved by using a tube with a conventional folding bellows). The advantage in relation to the longitudinal stiffness of a straight tube is attended by high bending resistance. The high flexibility of a tube with a folding bellows section of normal shape is attended by low resistance to longitudinal elongation when high internal pressure is applied.

SUMMARY OF THE INVENTION

The object is achieved by a flexible tube which is therefore provided by the present invention and which has at least one folding bellows which has a plurality of convolutes which have been formed in the wall of the tube and which run across an external surface of the tube, where there is no separation between the convolutes in an axial longitudinal direction of the tube and the folding bellows has at least one convolute which has two opposite bending zones and two restricted elongation zones, where the arrangement has the restricted elongation zones between the opposite bending zones, and the height of the external surface of the convolutes in the restricted elongation zones is below the height of the external surface of the convolutes in the bending zones but still above the external surface of the tube, and the wall thickness of the flexible tube in at least one restricted elongation zone in at least one convolute, preferably in all convolutes, of the restricted elongation zones of the tube is specifically greater than the wall thickness in the bending zones. For the purposes of the present invention, the meaning of the expression "rendered specifically greater than the wall thickness in the bending zones" is an increase in the wall thickness in the restricted elongation zones to a maximum of five times the value of the average wall thickness in the bending zones, but no less than 1.2 times the value of the average wall thickness in the bending zones. The specific increase in wall thickness in the restricted elongation zone is preset before the process of extrusion of the parison is complete, by virtue of a parison wall thickness that is radially partially higher in region of the subsequent restricted elongation zones.

This specific increase in wall thickness by virtue of prior adjustment before the extrusion process is complete leads to different wall thicknesses when comparison is made with the relatively large wall thicknesses that according to the prior art are the inevitable result of technological and process factors, by virtue of the different degrees of stretching in the restricted elongation zones and the bending zones.

Surprisingly, the flexible tube according to the invention, with folding bellows, complies with the requirements placed upon stiffness in an axial longitudinal direction when high internal pressure is applied, while at the same time exhibiting markedly better flexural flexibility than a prior-art pipe of folding-bellows design, in particular as in WO 2002/002981 A1, DE 197 07 518 C1 and EP 1 233 223 A2, particularly in non-optimized bending direction.

DETAILED DESCRIPTION OF THE INVENTION

The convolutes according to the present invention are subject mainly to flexural stress (there being no straight or flat region as described in the prior art of WO 2002/002981A1, DE 197 07 518 C1 and EP 1 233 223 A2), and the flexibility of the tube can therefore be adjusted via specific increase of the wall thickness of the convolutes sections in the restricted elongation zones. This appropriate adjustment of the wall thickness is achieved on the parison by using local, radial control of wall thickness during the extrusion process. To this end, the partial region on the parison which, after blowing, forms the restricted elongation zone is rendered thicker, via appropriate control of the hydraulically or electrically regulated blowing head. The die of a blowing head is in principle normally composed of a mandrel and of a static cylinder. The width of the gap between mandrel and cylinder determines the wall thickness of the parison. In order to regulate the wall thickness of the parison, the mandrel, which to this end is often of conical design, is moved axially forwards or backwards, and thus the width of the gap between mandrel and cylinder is altered, and the wall thickness of the parison is thus raised or lowered. Different wall thicknesses in the peripheral direction are preferably achieved by using the complicated system of partial wall thickness control (PWTC). For this, actuator mechanisms, for example those known as hydraulic actuators, or as electroactuators, are used during the extrusion process to achieve partial deformation, in a radial direction, of a dynamically flexible die ring, which is used in place of the abovementioned static cylinder, and the result of this can be differences in wall thickness distribution in the parison in the peripheral direction. The arrangement has these actuator mechanisms in a star shape around the flexible dynamic actuator ring. The dynamic PWTC system developed by Feuerherm in Troisdorf, Germany can particularly preferably achieve a specific increase in the wall thicknesses in the restricted elongation zones so as to meet the requirements placed upon the final product. The wall thickness ratio between the bending zones and the restricted elongation zones can be adjusted as a function of the requirement placed upon the flexibility, and, respectively, the stiffness of the folding bellows, and is not, as in the available prior art according to WO 2002/002981A1, DE 197 07 518 C1, EP 1 233 223 A2 and EP 1 176 351 A2, an evitable result of technological and process factors. The wall thickness ratio is not directly dependent on the geometry and fundamental wall thickness of the tube, but instead can be adjusted appropriately via partial wall thickness control in the blowing head, as the process proceeds. The flexibility and, respectively, stiffness of the restricted elongation zones can thus be adjusted appropriately and individually from parison to parison in accordance with the requirements placed upon the component, without changing the material or/and changing the tooling. For a straight region, a particular axial movement (tensile stress) would bring about constant elongation in the material, irrespective of wall thickness. In a flexible tube according to the present invention, application of pressure primarily causes flexural stresses. In contrast to the situation with pure tensile stress, when flexural stresses are applied to the flexible tube the maximum deformation in the region of the folding bellows of the tube depends on the wall thickness and can be adjusted by means of the same. An increase in the wall thickness reduces the stresses that arise when internal pressure is applied, but has almost no effect on flexibility in the optimized bending direction. Flexural stiffness in the direction perpendicular to the plane of the restricted elongation zone is increased, but the possibility of bending is maintained because of the presence of the convolutes, and this is a substantial advantage in comparison with the known folding bellows solutions with flat upper surfaces.

The invention combines the reduced heights of the external surface of the convolutes in the restricted elongation zones with the specific partial increase in wall thickness around the periphery, thus reducing the stress on the material in the folding bellows section when pressure is applied, without any, or with only slight, effect on overall flexibility.

In the least favourable case of a relative movement of the ends of the tube in an axial direction, the design according to the invention can also withstand a certain length increase.

When high pressure is applied, all of the sections of the flexible tube in the region of the folding bellows are subjected not only to flexural stresses but also to tensile stresses. Because the claimed folding bellows region has no straight section, there are no sudden changes in stiffness, and no notches, and these factors also help to prevent formation of stress concentrations and to reduce the extent of stress peaks; these can lead to failure of the component.

According to the invention, a flexible tube has at least one folding bellows section with a plurality of convolutes, preferably more than 2 convolutes, particularly preferably from 2 to 100 convolutes, very particularly preferably from 3 to 15 convolutes and especially preferably from 4 to 8 convolutes respectively per folding bellows. The number of folding bellows here depends on the geometry of the distance to be bridged by the flexible tube. According to the invention, there is at least 1 folding bellows provided in the flexible tube.

The angle between the opposing flexural sections in the flexible tube according to the invention is preferably from 150-210°, preferably 180°, and the angle between the opposing restricted elongation sections is likewise preferably from 150-210°, preferably 180°.

In the tube according to the invention, there is an increase in the wall thickness in the restricted elongation zones to at most five times the value of the average wall thickness in the bending zones, but to not less than 1.2 times the value of the average wall thickness in the bending zones.

Preference is given to a wall thickness increase to from 150% to 300% of the average wall thickness of the bending zones, in the restricted elongation zones.

There is no particular restriction on the material from which the flexible tube according to the invention is produced, with the proviso that the tube is flexible. If the blow-moulding process is used, the flexible tube and the bellows can have been formed from any desired thermoplastic resin. The expression "thermoplastic resin" preferably encompasses synthetic polyamides, polyesters, polyacetals, block polyester-ether copolymers, ethylene-propylene-diene elastomer (EPDM), polyolefins, in particular polypropylene, and also mixtures of blends thereof. It is particularly preferable to use polyamide.

In one preferred embodiment, the flexible tube according to the invention has a transition zone between the restricted elongation zones and the bending zones. For the purposes of the present invention, a transition zone describes a tangential edge- and notch-free transition from the relatively high convolutes of the bending zone to the relatively low convolutes of the restricted elongation zone.

In one preferred embodiment, a folding bellows of a flexible tube according to the invention has at least two convolutes which in turn have two opposite bending zones and two restricted elongation zones, arranged between the bending zones, where the length of the convolutes in the restricted elongation zone increases in a peripheral direction from a first convolute toward a second convolute. An increase in the length of the convolutes in the restricted elongation zone from a first convolute toward a second convolute means for the purposes of the present invention that the length of the convolute in the restricted elongation zone increases from a first convolute to an adjacent second convolute.

In order to avoid the large changes in stiffness in the folding bellows section of the flexible tube according to the invention, where these would cause stress peaks in the event of relative movements of the two ends of the tube, it is preferable that the shape of the transition zones between the restricted elongation zones and the bending zones is smooth, without edges or notches. In a preferred embodiment, the external surface of the adjacent convolutes has no discontinuity; this feature, and also the lack of discontinuity in the shape of each convolute itself, are further reasons for the elimination of stress peaks in the event of the abovementioned movements and on application of internal pressure.

In one preferred embodiment, in order to reduce the length increase on application of internal pressure, the external diameter of the restricted elongation zones can be further reduced. This has only a small effect on the flexural flexibility of the tube in the optimized bending direction. It is important here to continue with the connection of the convolutes, in order to inhibit pure tensile stressing in the folding bellows region during relative movements of the two ends of the tube in an axial direction.

According to the invention, the stiffness of the folding bellows region in the bending direction and also in the direction of longitudinal extension is modified via appropriate adjustment of the wall thickness in the restricted elongation zones.

According to the invention, the flexible tube of the present invention has at least one folding bellows section. As a function of the task allocated to the flexible tube, for example in the engine compartment of a vehicle, in particular motor vehicle, the tube can have a plurality of folding bellows sections, preferably from 2 to 10, or else a large plurality of folding bellows sections, in particular from 2 to 100.

According to the invention, a folding bellows section has at least one convolute, preferably a large plurality of convolutes, i.e. from 2 to 100, particularly preferably a plurality, i.e. from 2 to 50 convolutes.

For the purposes of the present invention, the meaning of the expression "no separation between" is that, in an axial direction, the region between two adjacent convolutes cannot be flat.

For the purposes of the present invention, the meaning of the expression "the height of the external surface of the convolute in the bending zones" is a maximum external diameter smaller than the maximum external diameter in the bending zones.

For the purposes of the present invention, the meaning of the expression "above the external surface of the tube" is a larger maximum external diameter than the external diameter of the smooth tube.

According to the invention, the arrangement has the convolutes of a folding bellows adjacent to one another in an axial longitudinal direction of the flexible tube.

In one preferred embodiment, the exterior shape of two mutually connected convolutes is the shape of a curve similar to a sine wave. This means that there is no separation between the convolutes. At least one of the convolutes has two opposite bending sections and two restricted elongation zones. The arrangement has the restricted elongation zones between the two bending zones, and the height of the external surface of the convolutes in the restricted elongation zone could be less than the height of the external surface of the height in the bending zones.

BRIEF DESCRIPTION OF THE SEVERAL VIEWS OF THE DRAWINGS

The present invention will be illustrated by the figures below:

FIG. 3 shows the plan view of the bending section of the tube according to the invention.

FIG. 4 shows the corresponding side view, and

FIG. 5 shows the plan view of the restricted elongation section of the tube according to the invention, and the arrow here indicates the optimized bending direction.

FIG. 6 shows the sectional view of the corrugated material with wall thickness appropriately adjusted according to the invention, and in the example shown the wall thickness in the restricted elongation zones corresponds to twice the wall thickness in the bending zones. FIGS. 3 to 6 provide an illustration according to the invention of the tube with appropriate adjustment of wall thickness.

FIGS. 3-6 show a tube according to the invention where the arrangement of convolutes is similar to a sine wave. There is no separation between the convolutes, and, in an axial direction, there are no smooth regions arising between two adjacent convolutes.

Figure 1:
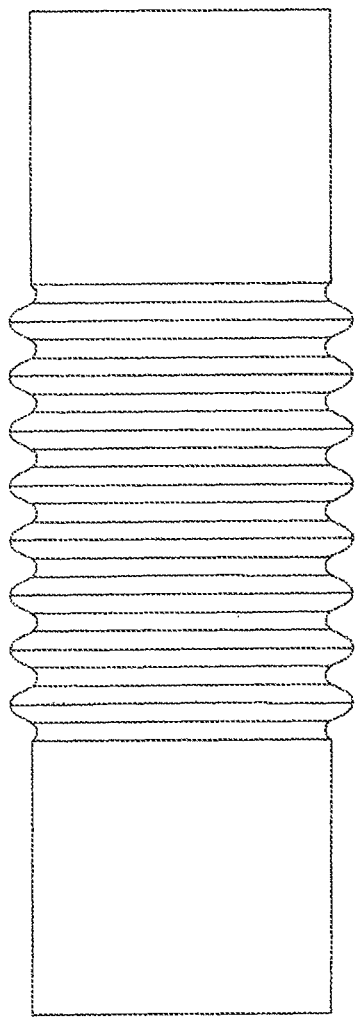
FIG. 1 shows the plan view of a conventional corrugated tube.
Figure 2:
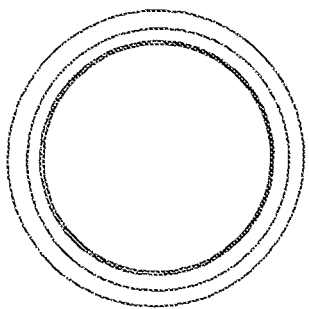
FIG. 2 shows the corresponding side view of a prior-art corrugated tube.

As illustratively shown in FIGS. 3, 4, 5, and 6, there is provided a restricted bending direction (103), the restricted elongation zone (100, 104), transition zone (105), bending zones (106, 107), preferred bending direction (109). Also as shown in FIGS. 3 and 5 there is the height of the external surface of the tube (102), the height of the external surface of the convolutes in the restricted elongation zone (101), and the height of the external surface of the convolutes in the bending zones, (108), wherein is it clear 102<101<108.

Tubes according to the invention are preferably used as fluid lines. For the purposes of the present invention, fluid lines are preferably liquid lines or air lines. Preferred liquid lines are fuel hoses, coolant hoses or filler necks.

Preferred air lines are inlet ducts, crankcase-ventilation lines, clean-air lines, charge-air ducts, ventilation pipes, cooling-air lines or air-conditioning-system air lines.

These are preferably used in motor vehicles, in particular in the engine compartments thereof, but they can also be used in any of the other applications where substances have to be transported under pressure.

In particular, a flexible tube according to the invention is used for air lines or, respectively, liquid lines in motor vehicles.

To this end, before the process of development of a flexible tube according to the invention is complete, it is appropriately adjusted in respect of its cross section, its diameter, and also its external surface. According to the invention, appropriate adjustment continues during the production process, by using wall thickness modification.

Preferred cross sections of a flexible tube according to the invention are circular, oval or elliptical.

Flexible tubes according to the invention are produced by known process methods for the processing of the abovementioned starting materials. Preferred production processes are blow moulding, and in particular sequential coextrusion blow moulding.

It will be understood that the specification and examples are illustrative but not limitative of the present invention and that other embodiments within the spirit and scope of the invention will suggest themselves to those skilled in the art.

Examples

The polymer selected for the analyzes was a material with isotropic properties and with modulus of elasticity of about 170 MPa. Three different load situations were studied, and specifically for I) a conventional, symmetrical, round tube with folding bellows according to FIG. 1, and II) a tube according to FIGS. 3 to 5 without the specific increase according to the invention in wall thickness in the restricted bending zones, and III) a tube according to 3 to 6 with the increase according to the invention in wall thickness in the restricted bending zone. The wall thickness was increased from 2.5 mm to 5 mm in the restricted elongation zones. In all three designs, the flow cross section was 2316.5 mm$^2$.

In loading situation 1, the internal pressure applied was adjusted to 3.5 bar absolute; loading situation 2 simulates an engine movement of 10 mm in the optimized bending direction, while loading situation 3 simulates an engine movement of 10 mm in the least favourable bending direction, which ran perpendicular with respect to the plane of the restricted elongation zones. All of the loading situations are considered separately, in order to eliminate interactions.

The results in the table below show in particular the difference in the resultant length increase caused by the internal pressure, and the von Mises stresses caused by the engine movements. A point to be noted here is that, when the flexural stresses are compared with those in reference folding bellows design I, even in a direction perpendicular to the optimized bending direction, in the case of design II they are 25% higher but in the case of design III they are similar. In the case of design III it is moreover possible to achieve a marked reduction of 61% in the length increase when internal pressure is applied.

| Property | Unit | Conventional corrugated tube | Tube according to FIGS. 3 to 5 with no appropriate adjustment of wall thickness according to the invention | Flexible tube according to the invention with appropriate adjustment of wall thickness according to the invention |
| --- | --- | --- | --- | --- |
| Flow cross section | [mm$^2$] | 2316.5 | 2316.5 | 2316.5 |
| Average wall thickness | [mm] | 2.5 | 2.5 | average: 2.5; 5 in restricted elongation zones |
| Length increase for internal pressure of 3.5 bar absolute | [mm] | 7.7 | 5.7 | 3 |

-continued

| Property | Unit | Conventional corrugated tube | Tube according to FIGS. 3 to 5 with no appropriate adjustment of wall thickness according to the invention | Flexible tube according to the invention with appropriate adjustment of wall thickness according to the invention |
|---|---|---|---|---|
| Reduction of length increase for internal pressure of 3.5 bar absolute in comparison with the reference design mentioned | [%] | 0 (reference design) | −26 | −61 |
| Maximum von Mises stress for engine movement in optimized bending direction | [MPa] | 4 | 4 | 4 |
| Maximum von Mises stress for engine movement in direction perpendicular to optimized bending direction | [MPa] | 4 | 5 | 4 |

What is claimed is:

1. A flexible tube having an internal surface and an external surface, with at least one folding bellows extending along at least a portion of the tube, the bellows comprising a plurality of adjacent convolutes formed in the wall of the tube and extending circumferentially around the tube, where the plurality of adjacent convolutes define a plurality of interspersed peaks and valleys transverse to an axial longitudinal direction of the tube, and the external surface between adjoining peaks and valleys is curvilinear in the axial longitudinal direction, wherein at least one convolute has two opposite bending zones and two opposite restricted elongation zones, with the restricted elongation zones between the opposite bending zones, and the height of the external surface of the peak of the at least one convolute in the restricted elongation zones is below the height of the external surface of the peak of the at least one convolute in the bending zones but still above the external surface of the tube, and the at least one convolute has a first wall thickness about the periphery of at least one restricted elongation zone and a second wall thickness about the periphery of the bending zones, wherein the first wall thickness is greater than the second wall thickness.

2. The flexible tube according to claim 1, wherein the folding bellows has from 2 to 100 convolutes.

3. The flexible tube according to claim 1, wherein each of the convolutes comprises the two restricted elongation zones and the two opposite bending zones, with the restricted elongation zones being opposite one another and between the bending zones, and the wall thickness of the flexible tube in all of the convolutes of the restricted elongation zones of the tube is specifically greater than the wall thickness in the bending zones.

4. The flexible tube according to claim 1, wherein the flexible tube has a transition zone between the restricted elongation zones and the bending zones.

5. The flexible tube according to claim 1, wherein the folding bellows has at least two convolutes, which in turn have two opposite bending zones and two restricted elongation zones, arranged between the bending zones, where the length of the convolutes in the elongation zones increases or decreases in a peripheral direction from a first convolute towards a second convolute.

6. The flexible tube according to claim 1, wherein flexible tube is composed of a thermoplastic resin.

7. A flexible tube according to claim 1, wherein the flexible tube has a circular, oval or elliptical cross section.

8. A method of for transporting fluids, comprising:
passing a fluid along the internal surface of the flexible tube according to claim 1.

9. The method according to claim 8, wherein the fluid is liquid or air.

10. The method according to claim 9, wherein the liquid is a liquid coolant or a liquid fuel.

11. The flexible tube according to claim 1, wherein the first and second wall thickness of the at least one convolute are in a direction transverse to the longitudinal axis of the tube about the periphery of the at least one convolute.

12. The flexible tube according to claim 1, wherein a cross-section of the apex of the peaks and a cross-section of the base of the valleys in the longitudinal direction of the tube are circular segments.

13. A flexible tube having an internal surface and an external surface, with at least one folding bellows extending along at least a portion of the tube, the bellows comprising a plurality of adjacent convolutes formed in the wall of the tube and extending circumferentially around the tube, with each convolute comprising:
a circumferential peak extending transverse to an axial longitudinal direction of the tube, and
two opposite bending zones and two opposite restricted elongation zones, with the restricted elongation zones circumferentially between the opposite bending zones, wherein the height of the external surface of the peak in the restricted elongation zones is below the height of the external surface of the peak in the bending zones but still above the external surface of the tube, wherein a first wall thickness about a portion of the periphery of the restricted elongation zones is greater than a second wall thickness about a portion of the periphery of the bending zones.

14. The flexible tube according to claim 13, wherein the first wall thickness and the second wall thickness extend in a radial direction along at least the apex of the peak of the convolute.

* * * * *